US009219799B2

(12) United States Patent
Jensen et al.

(10) Patent No.: US 9,219,799 B2
(45) Date of Patent: Dec. 22, 2015

(54) SYSTEM AND A METHOD OF OPERATING IT

(71) Applicant: Bang & Olufsen A/S, Struer (DK)

(72) Inventors: Søren Borup Jensen, Struer (DK); Arne Kurt Andersen, Holstebro (DK)

(73) Assignee: BANG & OLUFSEN A/S, Struer (DK)

(*) Notice: Subject to any disclaimer, the term of this patent is extended or adjusted under 35 U.S.C. 154(b) by 392 days.

(21) Appl. No.: 13/709,626

(22) Filed: Dec. 10, 2012

(65) Prior Publication Data

US 2013/0151592 A1    Jun. 13, 2013

(30) Foreign Application Priority Data

Dec. 9, 2011   (DK) ................... 2011 00956
Dec. 20, 2011  (DK) ................... 2011 00983
Dec. 21, 2011  (DK) ................... 2011 00988
Jan. 19, 2012  (DK) ................... 2012 00050

(51) Int. Cl.
*G06F 15/16*   (2006.01)
*H04L 29/06*   (2006.01)
*H04L 29/08*   (2006.01)

(52) U.S. Cl.
CPC ............... *H04L 67/42* (2013.01); *H04L 67/02* (2013.01); *H04L 67/10* (2013.01)

(58) Field of Classification Search
CPC ............. G06F 17/30873; G06F 17/30283; G06F 17/30017; H04L 67/02; H04L 67/10; H04L 67/42; H04N 21/472; H04N 21/63; H04N 21/637
See application file for complete search history.

(56) References Cited

U.S. PATENT DOCUMENTS

| 7,290,204 B1* | 10/2007 | Kanno et al. ............... 715/205 |
| 7,483,958 B1 | 1/2009 | Elabbady et al. |
| 7,949,727 B2 | 5/2011 | Jensen |
| 2009/0132942 A1* | 5/2009 | Santoro et al. .............. 715/765 |
| 2009/0282451 A1 | 11/2009 | Jensen |
| 2012/0054616 A1* | 3/2012 | Mittal ......................... 715/722 |
| 2012/0178426 A1* | 7/2012 | Filipov ..................... 455/414.1 |
| 2012/0204093 A1* | 8/2012 | Habarakada et al. ......... 715/234 |

FOREIGN PATENT DOCUMENTS

| KR | 20110078845 A | 7/2011 |
| WO | WO-2007027883 A1 | 3/2007 |
| WO | WO-2007120514 A2 | 10/2007 |

OTHER PUBLICATIONS

Vidyarthi, Neil. "Imagine: Your iPhone/Android Could Stream Video to any TV", Jul. 12, 2010. Times, pp. 1-2.*
Danish Search Report for Application No. PA 2011 00988 dated Aug. 3, 2012.

* cited by examiner

*Primary Examiner* — Jonathan Bui
(74) *Attorney, Agent, or Firm* — Harness, Dickey & Pierce, P.L.C.

(57) ABSTRACT

A system and a method of operating the system comprising a media provider comprising a first user interface and a controller comprising a second user interface, the method comprising the user browsing the network using the controller and viewing media information on the controller, such as an iPad. The user may control the controller to stream the media information to a media provider, which may be a TV and so that the media information is then provided on both the TV and iPad in a synchronized manner. Subsequent to that, the TV may receive the media information directly from the network so that the controller may be used for other purposes.

14 Claims, 2 Drawing Sheets

SYSTEM AND A METHOD OF OPERATING IT

This application claims priority to Danish Appln. No. PA 2011 00956, filed on Dec. 9, 2011; Danish Appln. No. PA 2011 00983, filed on Dec. 20, 2011; Danish Appln. No. PA 2011 00988, filed on Dec. 21, 2011; and Danish Appln. No. PA 2012 00050, filed on Jan. 19, 2012, the entire contents of each of which is incorporated herein by reference.

The present invention relates to system comprising a media provider, such as a TV or media center with a new type of data switching capability, and a controller, such as an iPad, where the controller may be used for e.g. browsing the internet, identifying media information, have the media information provided by the controller and instructing the media provider to also provide the media information.

The method applied enhances the usability of media players and providing media information to a user.

A first aspect of the invention relates to a system comprising a media provider and a portable controller, wherein:
the media provider comprises:
  a first network interface configured to receive first media information from a first network,
  a receiver configured to receive second instructions from the controller,
  a first user interface,
  a processor configured to receive the second instructions from the receiver, identify corresponding media information, instruct the first network interface to retrieve the corresponding media information from the network interface and control the first user interface to provide the retrieved media information,
the portable controller comprises:
  a second network interface configured to receive second media information from a second network,
  a second user interface configured to receive first instructions, identify, from the first instructions, media information and to provide the identified media information,
  a transmitter configured to output second instructions to the receiver, the second instructions relating to the identified media information,
wherein the controller is configured to continue providing the media information subsequent to the transmitter outputting the information.

The system may comprise additional controllers or media providers or media sources if desired. The media provider and controller may be separate units, and the controller may be handheld or adapted to be handheld, so that the transmitter/receiver are adapted to transmit/receive wireless signals.

In this connection, a media provider may be an ordinary TV, a media centre, or the like. Usually, the media provider will comprise a display or monitor as well as sound providers, including relevant amplifiers, filters and the like. The media centre may comprise media stores, such as a hard disc or inputs for media information, such as inputs for receiving media information from hard discs, CD/DVD/Blu-ray discs, set top boxes, internet connections, tuners for receiving TV or radio signals, or the like.

The first network interface may be of any desired type, such as for receiving/transmitting wireless signals or wired signals. The network may be a LAN, a WAN, the internet or a combination thereof. The interface may be configured to communicate using any desired protocol, such as Ethernet.

The receiver and transmitter may be configured to communicate over a wired connection or over a wireless connection, such as via Ethernet, LAN, WAN, Bluetooth, WiFi, IR communication or the like.

The first user interface is configured to provide media information. Thus, the first user interface may comprise a display/monitor of any type (LED, LCD, OLED, Plasma, CRT or the like) and/or sound generators, such as loudspeakers. The user interface may also be configured to receive instructions, such as comprising a keypad, keyboard, a touch pad, a microphone, a movement sensor, a gesture sensor, a camera, or the like.

The receiver may be seen as part of the user interface, as it may receive instructions from the controller and thus allows a user to enter instructions also to the media provider via the controller.

Naturally, the receiver and network interface may be one and the same element when the instructions forwarded between transmitter and receiver is of the same type which is handled by the network interface. Alternatively, the receiver and network interface may be adapted to perform different types of communication.

The processor may be an FPGA, an ASIC, a microchip, a hardwired circuit, a software controlled processor, a DSP or any other type of controller, which may be a monolithic unit or a distributed system.

The network interface may itself be able to generate the instructions and data required for requesting media information on the network, or the processor may provide such data if desired.

The portable controller may have a size of a lap top computer or smaller. A suitable type of controller is a pad computer, such as an iPad, or a smart phone, such as a Samsung Galaxy or an iPhone. The controller may be a PC, such as a lap top or a palm top, a reader (e-book or the like), an iPod Touch, or the like. Preferably, the controller is a wireless device being battery powered and adapted to perform wireless communication.

As is the situation for the first network interface, the interface may be configured for wired and/or wireless communication and may be suited for any protocol. The first and second network interfaces may be configured to communicate with the same network.

The second user interface may also comprise a monitor/display and/or sound generators and any desired amplifiers, filters, controllers, media stores and the like.

The second user interface is configured to receive instructions, such as from a user, whereby it may comprise a touch pad, a touch display, a keyboard, a microphone, a movement sensor, a camera, a gesture sensor, or the like. The first instructions render the user interface able to identify media information. The first instructions may be generated via a browsing on the internet and may thus be a URL to the media information or a file location on the internet, a local network, a media store, or the like.

The providing of the identified media information may be a playing of a song, a movie, the providing of images, pictures or the like on a display. The media information may be downloaded to the controller if desired or streamed.

The instructions transmitted relate to the identified media information. This relating information may be the actual media information or part thereof and/or information identifying or pointing to a location where the media information may be retrieved. The information may comprise log-in details or the like of required for accessing the media information. The information may also comprise additional information required for either identifying the media information or a particular part thereof.

When the controller continues to provide the media information even when having instructed the media provider to provide it, a person operating the controller may move about without thereby missing a part of the media information provided.

In one embodiment, the transmitter is configured to output the second instructions comprising at least a first part of the identified media information and wherein the processor is configured to initially control the first user interface to provide the at least first part of the media information and subsequently instruct the first network interface to retrieve at least a second part of the identified media information from the network interface and control the first user interface to provide the at least second part of the identified media information.

When the second instructions comprise at least a first part of the identified media information, this information is derivable from the second instructions, and the first user interface may immediately start providing it. Subsequently, or simultaneously, the media provider may receive the second part from the network in time for the second part to follow the first part and thus make a seamless shift between the first part and the second part. In some embodiments, the media provider will immediately identify and access the second part in order to make the transition as soon as possible in order to be insensitive to any disruption of data flow from the controller, such as in the situation where the first part is streamed from the controller. The first part provided in the second instructions may have any size or time duration, such as the first 1, 2, 3, 4, 5, 6, 7, 8, 9, 10, 20, 30, 40 or 50 seconds of the media information. In one embodiment, the first part is streamed from the controller until a user stops this streaming.

The second part may have any duration, and the first and second parts may overlap, whereby the first and second parts may comprise identical parts of the media information. Usually, media information is information provided over time, such as music, speech, movies, films, programs or the like.

In that embodiment, the transmitter may be configured to, when the second user interface receives a release instruction, forward release information to the receiver, the controller being configured to control the first user interface to provide the at least second part of the identified media information, when the receiver has received the release information. Thus, the first part is the part received from the controller before the release instruction is received, where after the media provider will receive the second part, such as a remainder of the media information, from the network.

Seen from the controller, a user may browse the Internet and find interesting media information which then may be transferred to the media provider by the transmitter sending the second instructions. Thereafter, the media information is provided on the media provider as well as the controller, where the media information actually is streamed from the controller to the media provider. The user may enter a release instruction into the controller in order to indicate that the controller is to be used for something else, whereby the release instruction is fed to the media provider which now continues to provide the media information but now from the network. Then, the controller may be used for other functions, such as for the browsing of the network for additional media information.

In that situation, the transmitter would be configured to receive, from the second user interface, additional inputs, receive other media information from the second network and provide the other media information, while the first user interface continues to provide the media information. Again, the media information may be downloaded or streamed into the controller.

In one embodiment, the transmitter is configured to output to the receiver, as at least part of the second instructions, timing information in accordance with which the second user interface provides the identified media information, and wherein the processor is configured to control the first user interface to provide the corresponding media information in accordance with the received timing information.

This is especially relevant where the media information is not streamed from the controller to the media provider. In general, non-synchronized experience of the same media information from two sources may be an undesirable experience.

This timing information may be a point in time into the media information at which the present providing of the media information on the controller is, so that the providing on the first user interface of the same media information is synchronized. It is noted that the user may be experiencing the media information for a period of time on the controller before instructing the controller to provide it also on the media provider.

The timing information may be a point in time or a clocking signal, if desired. Alternatively, the timing signal may be a part of the media information or actually the media information, where the media provider will then browse through the media information in order to determine the corresponding position and start providing the media information from that point in time. Naturally, a delay may be taken into account due to processing and transmission delays etc.

Naturally, if synchronization is desired, it may be desired to determine a period of time within which such synchronization is desired. In sound, synchronization within 20 ms is desired in order to not distort sound. In video, less strict boundaries may be accepted.

In one embodiment, the second instructions comprise an URL at which the corresponding media information may be accessed. In addition, a point in time may be transferred, or the URL may comprise this information, if the above synchronization is desired.

In one embodiment, the media provider comprises a switch element and one or more signal inputs connected to the switch element, the first network interface and the first user interface being connected to the switch element and the processor being configured to control the switch element to switch signal or information from a controllable input or the first network interface to the first user interface, the controller being configured to, when the receiver receives the second instructions, instruct the switch element to switch signals or information from the first network interface to the first user interface.

Switch elements of this type are known, but it is desired that the controller controls the switch so that upon receipt of the second instructions, the switch is operated so that the user does not have to remember which input the signal will be received on. Thus, an automatic controlling of the switch to feed the media information to the user interface is desired.

In another aspect, the invention relates to a method of operating a system comprising a media provider comprising a first user interface and a controller comprising a second user interface, such as the system according to the first aspect, the method comprising:

A. the second user interface receiving browsing information identifying media information available via a network, B. the controller receiving the media information from the network, providing the media information on the second user interface and outputting corresponding information to the media provider, C. the media provider receiving the corresponding information and subsequently receiving the media information from the network and providing the received information on the first user interface, wherein step C comprises the first and second user interfaces providing the received media information simultaneously.

The browsing information may be information identifying a location of the media information, such as on a network, a storage, or the like. The browsing information may be a web page, an URL or the like. The browsing information may be derived from internet browsing, such as using a mouse or a touch display.

The providing of the media information may be a providing of a movie clip, film, speech, music, song, program or the like on a mom, a speaker, or the like.

Again, the corresponding information may be the media information or part thereof and/or a location at which the media information or part thereof may be accessed, as well as other required and/or relevant information.

That the two user interfaces provide the media information simultaneously will mean that the same song or the same movie/album/film/program/speech or the like is provided at the same time. As described above, it may be desired that this providing is synchronized.

In one embodiment, step C. comprises:

I: the controller initially providing at least a first part of the media information to the media provider and the first user interface providing the at least first part of the media information and, II: subsequently, the media provider receiving at least a second part of the media information from the network and the first user interface providing the at least second part of the media information.

The initial providing of the media information from the controller to the media provider may be a streaming or a download thereof.

The second part of the media information may also be downloaded or streamed as desired. The first and second parts may overlap or not. Preferably, the first and second parts together form the full media information desired, such as a song, an album, a movie, a film, a program or the like. Alternatively, the user may start viewing e.g. a movie when it has started, whereby the first part starts when the user controls the controller to start providing on the media provider, and the first part may end when the user controls the controller to stop providing the media information. The second part may start at a point in time while providing the first part, or the second part may start when the first part ends. The second part may end when the song/movie or the like stops or when the user turns of the media provider or controls the media provider to provide other media information, such as from another media source or location.

As mentioned above, step I could comprise the second user interface receiving a release instruction and the transmitter forwarding release information to the media provider, and wherein step II is initiated by the media provider receiving the release information.

The user may enter a release instruction into the controller to have it stop providing the media information. The controller may then output a release instruction to the media provider in order to have the media provider shift to the mode where it receives the media information from the network, if this has not happened earlier. The instruction could also be the lack of additional parts of the media information to the media provider, and as described above, the media provider may of its own accord start accessing the media information from the network before the end of the first part.

In one embodiment, step C comprises, such a in one of the above steps I or II, the second user interface receiving additional instructions identifying other media information, the controller receiving the other media information from the network and the second user interface providing the other media information, while the first user interface continues to provide the received media information.

In one embodiment, step B comprises outputting timing information to the media provider and wherein step C comprises the first and second user interfaces providing the media information in a synchronized fashion. This timing information may be a point in time or a clocking signal or any other information useful for allowing the media provider to shift to or select the part of the media information presently provided on the controller. Synchronization is usually desired and is a known technology.

in one embodiment, the media provider, during step B., provides second media information received from an information input. Then, when step C initiates, the media provider is automatically brought to the mode where the media information identified is provided. Then, the user needs do nothing else than instruct the controller to send the second instructions.

In the following, preferred embodiments of the invention will be described with reference to the drawing, wherein.

Figure 1:
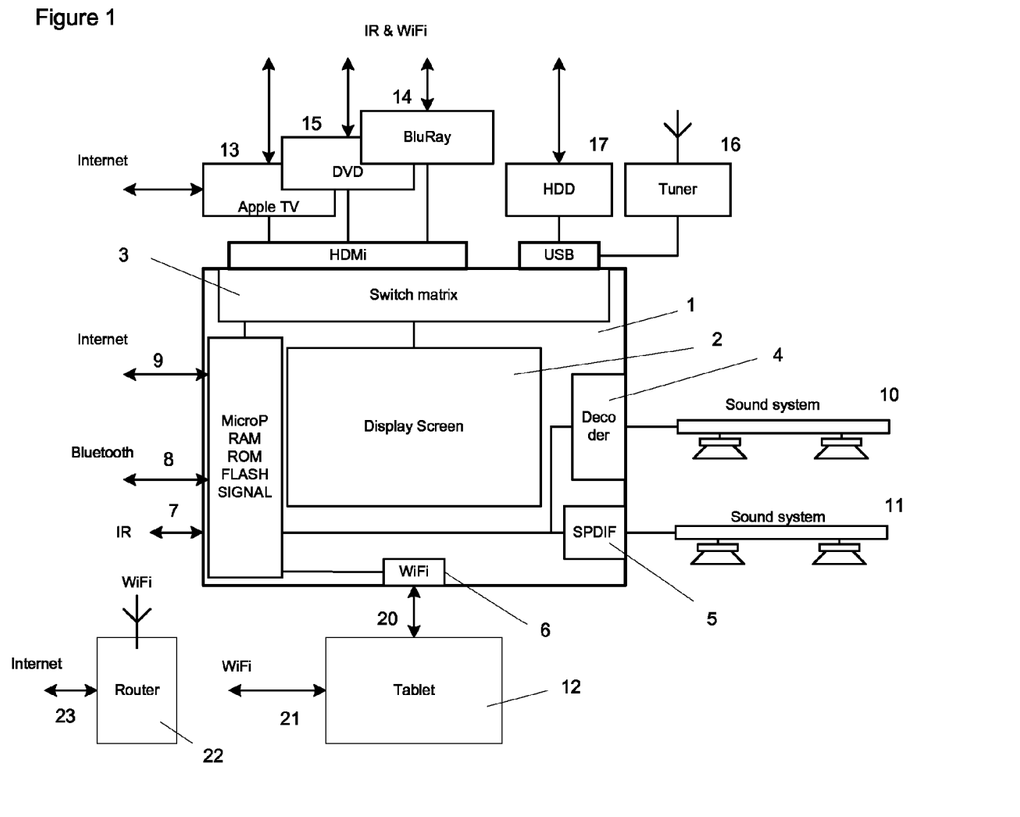
FIG. 1 illustrates a preferred embodiment of the invention.

A preferred embodiment of a system as configured according to the invention is illustrated in FIG. 1.

A media provider or player (1) having a display (2) e.g. being an LCD screen, a plasma screen or the like, has one or more switches organized in a matrix (3), addressable and able to connect to any of a plurality of external HDMi devices (13, 14,15).

Further, the media player has sound providing means, such as loudspeakers. These means may optionally be external devices or, as illustrated, be partly embedded into the media player. The sound providing means (4) preferably include multi channels and surround sound features (e.g. 5.1, 7.1, 10.2 or other/higher), and may further comprise a digital sound output (5) e.g. an optical feature (e.g. SPDIF). Optionally, the multichannel decoder is embedded into the media player.

Further, the media player (1) comprises data communication and control means. According to the actual functional requirements of the individual application, different technologies may be selected.

In the preferred embodiment, data communication and control is enabled for: an interactive two way WiFi based media player/smart phone/tablet (6), an IR based remote controller (7), an interactive two way Bluetooth based media player/smart phone/tablet (8), and a wired or wireless Internet connection (9).

Sound provider means (10) including active or passive loudspeaker(s), amplifier(s) may be externally connected or optionally partly or fully integrated into the media player (1).

External sound provider means, e.g. an audio system including DAB receiver, amplifier and loudspeakers, can be connected via the digital audio connection (11).

External equipment/devices may be accessable via HDMi connectors and/or via USB-/mini USB connectors.

Examples of HDMi devices are: Set Top Box (e.g. Satellite), Blu-ray player/recorder (14), DVD player/recorder (15), Internet connection e.g. Apple TV (13). Each of the HDMi devices may be enabled with input control means in or on the surface of the device; control means like an IR remote terminal, and physical command keys or alike.

Examples of USB devices are e.g. a terrestrial supported tuner MPEG (16) and a storage device e.g. a HDD (17).

In the preferred embodiment of a configured system, a tablet is used as a user interface device or controller for accessing and presenting multimedia data and providing this to the user. In addition, the tablet may be enabled with features to control the configured system i.e. the media provider and the connected sources of information (e.g. HDMi devices), and the sound providing means and the video providing means and the storage means and the sources of information residing on the Internet.

Thus, a wireless two way portable device or controller (12) is used as a combined media player and control device having access to the Internet (23) via an Internet router (22) via wireless means (21), e.g. Wifi, and having two way data communication e.g. WiFi (20), supporting control and data exchange with the media player (1) via wireless means (6).

In one embodiment, the data exchange includes a streaming of video and/or audio from an Internet data source via the two way control device to the media player and where the two-way control device fully or partly provides information to the user via video means and via audio means that are integrated in the device. The media player is connected to the Internet and has full access to information and data residing on the Internet. The device(s) connected to the external connectors are standard equipment like set top box, mpeg tuner, DVD player, Blu-ray player, a HDD and alike. The media player can be controlled via standard control means like a one way IR remote terminal, a two way device based on RF communication of the type Bluetooth and/or the type WiFi.

The media player has an embedded control system including a standard means like a microprocessor and/or a signal processor and memory means (e.g. RAM, ROM FLASH).

Specific standard subsystems support the control and data access to/from all external devices and to/from all data communication channels, including the internet sources of information.

Specific standard subsystems support the control and providing of sound and picture to the user, and support of the man-machine-interface.

Figure 2:
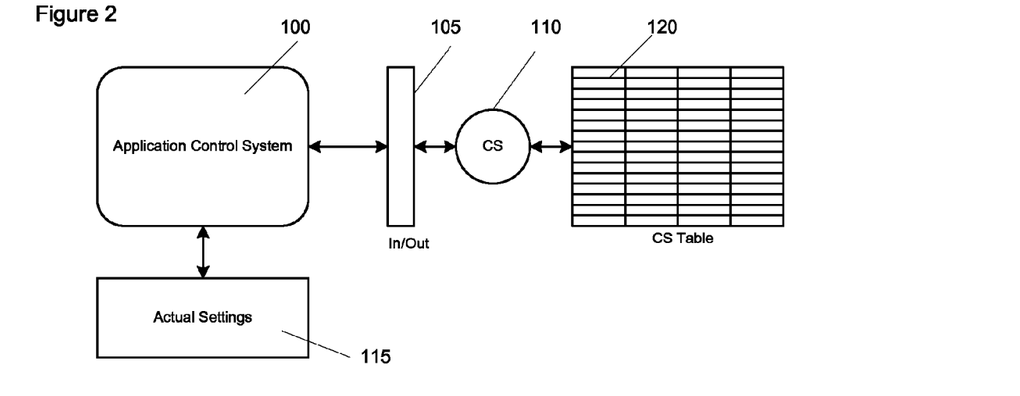
FIG. 2 structure of the constraint solver.

In another embodiment, as illustrated in FIG. 2, the control system (100) has an embedded configurator system, this system components being a constraint solver (110) and constraint table (120). The solver is a mean to find legal combinations among alternatives defined as relations in a table; these definitions being the content in a constraint table and specified in one of the mathematical notations "Disjunctive Form" or the "Conjunctive Form".

The constraint solver is a very effective manner of handling, i.e. establishing a functional mapping, of a large number of combinations that might exist having a complete configuration including all legal combinations of: all external devices, all the sources of information on these devices, all the sources of information on the Internet, all the operational modes in the tablet/smart phone, all the optional settings in the sound provider means, all the optional settings in the video provider means. One or more constraint tables may be defined as appropriate according to the actual requirements in a system. The one or more constraint tables can be accessed and managed by one single constraint solver.

Standard control command codes that are applicable in the external devices may be included as variables into the defined constraints. These codes e.g. PUC and CEC may be fully or partly applied. This implies that commands to/from the devices connected via HDMi are enabled by the constraint solver as required according to user given functional selections. Thus, the switch setting is implicitly caused by the user action and not commanded by the user via a specific command to enable a specific connector.

A learning mode automatically adapts sequences of control commands, given by the user in his/her manual selection of functional feature. The sequences are automatically recorded an appended as constraints in the constraint solver tables. This feature is strong support in the initial settings of system parameters related to switch settings for a specific signal path.

As an example: the user selects from the iPad a movie playing on this device to be shown on the media provider screen. The command given on the iPad implies an activation of the AppleTV device that's connected to the HDMi-1 connector on the media player. The user commands the media player to enable the HDMi-1, thus commanding the signal from the AppleTV to be applied on the media player.

Automatically, the switch settings related to the function as described above is recognized and recorded as constraints (event, response, action).

A simple operational example is shown below:

| Event | Response | Action |
|---|---|---|
| A user operates the tablet which is active on the Internet | tablet is active | |
| The user selects a YouTube movie to play on the tablet | YouTube movie displays on the tablet | |
| The user commands that the sound from movie has to be played on the rendering system | The rendering system is configured to receive a sound stream from the tablet, and provide this (the sound of the movie) on the rendering sound providing means | The switch matrix is enabled to deliver output to the sound decoder (SD) and/or the SPDIF channel |
| The user commands that the movie has to be displayed on the rendering screen | One option The rendering system is configured to receive a data stream from the tablet, and display this (the movie) on the rendering screen | The switch matrix is enabled to 1) deliver output to the sound decoder (SD) and/or the SPDIF channel and 2) display video on the LCD screen |
| | Another option the rendering system is configured to receive a data stream from an exteranl Internet connection via HDMi | The switch matrix is enabled to take input from the proper HDMi connector |
| | The rendering system is configured to display the data (the movie) on the media player | The switch matrix is enabled to 1) deliver output to the sound decoder (SD) and/or the SPDIF channel and 2) display video on the LCD screen |
| | A third option The rendering system is configured to receive a data stream from an Internet connection of the media player | The switch matrix is enabled to take input from the proper Internet connector |
| | The rendering system is configured to display the data (the movie) on the media player | The switch matrix is enabled to 1) deliver output to the sound decoder |

-continued

| Event | Response | Action |
|---|---|---|
| The user may have the operational control via the tablet. | The rendering system is configured to receive/send control commands from/to the tablet and to synchronize with the tablet device | (SD) and/or the SPDIF channel 2) display video on the LCD screen Optionally the tablet itself may fully or partly the content of the data stream similar to the stream displayed on the media player |

The constraint table enumerates all legal combinations of the parameters/settings that are part of the problem to be solved. Individual users may have individual access rights according to profiles addressed by a user ID. A simplified example of the table structure is given below:

| User | Function select | Switch to external device | Switch to sound system | Provide audio | Provide video | Internet |
|---|---|---|---|---|---|---|
| ID 1 | Use Tablet & YouTube | — | — | — | — | via Tablet |
| ID 1 | Use Tablet & YouTube | — | SPDIF/SD | yes | — | via Tablet |
| ID 1 | Use Tablet & YouTube | — | SPDIF/SD | yes | yes | via Tablet |
| ID 1 | Use Tablet control & YouTube | HDMi-1 | SPDIF/SD | yes | yes | external |
| ID 1 | Use Tablet control & YouTube | Internet | SPDIF/SD | yes | yes | directly |

The examples illustrate that the media player may receive a data stream from the Internet via alternative means in any combination at any time:

Fully or partly via the tablet, wirelessly.

Fully or partly via the Internet connector on the media player, wired or wirelessly.

Fully or partly via a HDMI connector from a source that is connected to the Internet, wired or wirelessly.

The constraint solver searches for one legal combination, simply by a sequential search through the table to find the one solution that matches actual parameters/settings. In case where two or more legal solutions are found the user is prompted to choose among the unbound/free variables that allow optional settings.

The attributes of the constraint solver (CS) is:

A 'deduction' function, which finds the solutions (conclusions) from given premises (variable values).

An 'induction' function, which finds the premises (variable values) that leads to one or more solutions (conclusions).

Works with unbound variables, i.e. the CS will find solution(s) at any time based on the variable values that's actual at the time of deduction. Thus, it also works with incomplete data where not all variables need to have a defined value.

A constraint table is loadable and reloaded on the fly, i.e. the application does not need to be rebooted to load new settings to reconfigure a system.

In the constraint table existing constraints (rows of variables) may be modified and deleted on the fly.

In the constraint table new constraints (rows) may be added on the fly.

In the constraint table new variables (columns) may be added on the fly.

The attributes of the constraint table (CT) is:

Default variable values are defined as part of the general system settings, e.g. initial switch settings to be used at start up.

The one or more CT tables are at any time a "picture" of the system configuration including the external devices which are connected to the rendering system, the connection being wired or wireless.

When new external devices are added, new variables related to this new device are added to the CT.

When external devices are removed, the variables related to this device are deleted from the CT.

When new external devices are added, new default relations among this new device and switch setting means are added to the CT.

Based on a specific user command, e.g. to access a device via the HDMi-1 connector, implies that the default relation (constraint) for that device and the related function is adjusted accordingly. Thus, the system is adaptive at a certain level and is learning from the user behaviour and may apply the knowledge for an automated mapping of functionality versus switch settings accordingly.

FIG. 2 illustrates the concept of the configurator/solution finder including the constraint solver (110) and the constraint table (120). The rendering application software i.e. the control system (100) interfaces to the CS via a list of all variables (105), where all variables are utilized in the defined relations in the constraint table (120).

The application program (100) allocates variables values to the respective variables in the list (105) and request the CS to find legal combination(s) fulfilling the given set of variable values. The CS returns an updated list (105) with the deduced set of variables values.

If two or more solutions exist, the user is presented with variables values to choose among to find a one single solution.

The control system (100) accumulates the legal combinations of variables in a table (115) storing actual settings of all variables related for a complete rendering system configuration.

Figure 3:
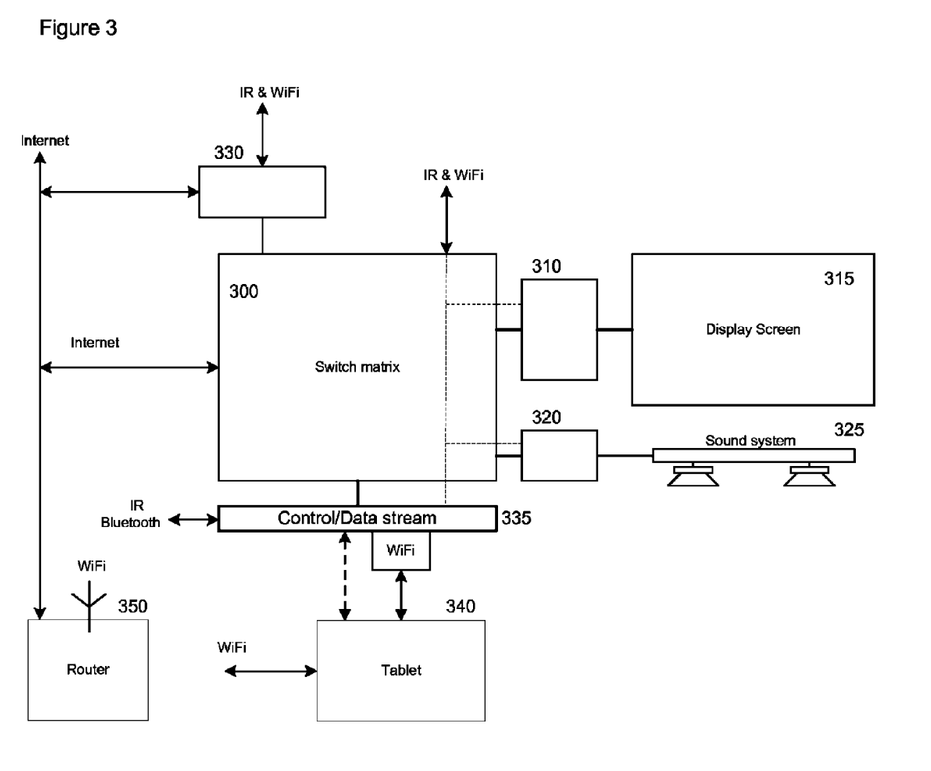
FIG. 3 illustrates switch setting configurations.

FIG. 3 illustrates an example of the applied means used in alternative distributions of control signals and data streaming.

The alternatives may be related to specific modes of control and data distribution:

| Mode | Tablet | Internet | Local | Providing/-rendering | Comment |
|---|---|---|---|---|---|
| Tablet | Run application | None | Control application | On tablet (340) | Access local source (e.g. music to play) Provide media to user on tablet Control application |
| Tablet & sound | Run application | None | Control application Control providing apparatus | On providing apparatus (325) | Access local source (e.g. music to play) Provide media to user on providing apparatus Control application Control providing apparatus, e.g. volume up |
| Tablet & sound & video | Run application | None | Control application Control providing apparatus | On providing apparatus (315 & 325) | Access local source (e.g. music to play) Provide media to user on providing apparatus Control application Control providing apparatus, e.g. volume up and picture colour |

In the examples, the data sources are residing locally on the tablet device 340. Alternatively, the data sources may be located on servers/services on the internet facilitating additional combinations of data access and providing of information to the user:

a. Tablet is accessing and running multimedia application from the internet (e.g. a YouTube file).
   i. The tablet is executing, controlling and providing the content of the media to the user on the tablet itself.

b. Tablet is accessing and running a multimedia application from the internet (e.g. a YouTube file).
   1. The tablet is executing, controlling and providing the content of the media to the user on the tablet itself.
   2. The user commands the media to be provided on the providing apparatus (315 & 325).
   3. The tablet enters into a control mode, enablet for control of the providing apparatus and the control of the data stream from the internet.
   4. The tablet streams (335) the content of the media file to the providing apparatus.

c. Alternatively to the tablet streaming the content from the media file as described in (b) above, the data may be accessed via other sources connected directly to the internet (330 or 300).
   i. The tablet enters into a control mode enabled for control of the providing apparatus and the control of the data stream from the internet, i.e. controlling the means enabled for the internet access.

Thus, in summary, the mode of operation enables the tablet to act as an interactive device for:
- fully or partly accessing multimedia information from a data source,
- fully or partly controlling the data source, i.e. act as a remote controller,
- fully or partly providing the content of the media on the tablet providing means,
- fully or partly control the providing devices, i.e. act as a remote controller,
- fully or partly stream the data content of the media to the providing apparatus,
- fully or partly, the switch matrix (300) is configured according to a signal paths and control paths and data streaming paths.

The configured system as discloses is very applicable to access and provide multimedia data/information for the user, the configuration may include a rendering system and mobile personal devices and one or more virtual or physical server(s) accessed via the internet.

The configured system as disclosed is very applicable to access and provide multimedia data/information for the user, the configuration including a rendering system and mobile personal devices and one or more virtual or physical server(s) accessed via the Internet.

Generally, examples of mobile device or controllers may be mobile phones, smart phones, media players, tablets, and book readers with specific product examples like the iPod, iPad, iPod Touch, and iPhone are characterized as being small and very effective type of products, when talking about digital data handling and providing media information to users. Typically the mobile device has storage means, data communication means, and control means as well as provider means for audio and video.

This type of equipment is normally interconnected by a combination of wired—and wireless means. The connection to the Internet/WAN/LAN may be wired or wireless as appropriate in the actual environment.

It is noted that:
- A multi media player may execute information: the media player may read and interpret the contents of a data set. A multimedia player may be a laptop, a tablet (e.g. an iPad or iPod Touch), a smartphone (e.g. an iPhone), or a PC.
- A media player may process and provide information: the media player may perform a play back of a media file as addressed in the data set; e.g. an MP3 file is accessed and played by the media player.
- A data set may contain different file type: audio (music), video (movie), photo (pictures), text (e.g. SMS, Twitter), and books (text and picture files).
- Control data may be a general term for an event supported by a standard two way communication protocols: "a request from one unit to another unit" and "a corresponding response to one unit from another unit".
- A constraint solver may be a manner of identifying legal combinations among alternatives defined as relations in a table. The definitions called a constraint table. An application of constraint tables may be seen in U.S. Pat. No. 7,949,727.
- User profiles may be applied to determine the access rights to data/files/streams residing on sources of information located on devices including the Internet. This may be seen in e.g. US 2009/0282451.
- A media player may primarily be a provider of sound and picture/video, and having connectors for interfacing to external sources and storing means.

In one embodiment of the invention, a method and a system may be provided to automatically configure a rendering system which is enabled to present multimedia information, the information having audio and video content to be provided to a user on rendering means, the configuring procedure is characterized by addressing a plurality of devices and including in a system configuration:

A media player having:
- Display means (LCD, LED, plasma or alike);
- One or more connectors to external devices and a related controllable switch matrix addressing and enabling access to and exchanging data and control with the one or more connected devices;
- One or more connectors for optical audio output (SP-DIF);
- Multichannel audio provider means (x.y) including a decoder (e.g. 5.1);

Wireless two way communication means (WiFi/Bluetooth) and a related mapping of available devices that enables exchanging data and control with wirelessly connected devices;

A wireless two way portable device being a combined media player and control device having access to the Internet and having two way data communication with control and data exchange with the media player;

A first data transmission channel enabled for transmission of an audio video data stream originating from a data source residing on the Internet via an Internet router and wirelessly via the portable combined media player and control device and wirelessly to the media player to be provided for the user;

A second data transmission channel enabled for transmission of an audio video data stream originating from a data source residing on external devices on the one or more connectors via the switch matrix to the audio video means of the media player to be provided for the user, and wirelessly the data stream is fully or partly transmitted to the portable combined media player and control device;

The first—and the second data transmission channels are configured according to an individual user access profile, and a trigger event caused by a first user action executed by the individual user;

In a second embodiment, the configuring procedure is a constraint solver including one or more constraint tables holding defined constraints and a solution finder that deduces legal combinations from the defined constraints, and where the one or more constraint tables dynamically fully can be loaded or reloaded, and/or fully or partly modified, and/or partly extended with more constraints.

A first user action may be a command via the two way portable combined media player and control device, the command is given by input means available on the device, the input means support detecting a pressure on a button, a touch on the surface, a gesture in close proximity to the surface, a gesture in distance to the surface and/or a spoken command in the proximity of the device.

The switch matrix may be set into a switch position caused by a functional selection in terms of a trigger event caused by a first user action executed by the individual user, the switch automatically enabling a data path to/from the media player to/from the external devices and to/from the two way portable combined media player and control device.

The invention claimed is:

1. A system comprising:
a media provider; and
a portable controller comprising,
   a first network interface configured to receive media information from a first network,
   a first user interface configured to receive first instructions, and identify, from the first instructions, the media information, and to provide the media information to a first display, and
   a transmitter configured to output second instructions, the second instructions relating to the media information,
the media provider comprising,
   a second network interface,
   a receiver configured to receive the second instructions from the portable controller,
   a second user interface, and
   a processor configured to receive the second instructions from the receiver, identify the media information based on the second instructions, and instruct the second network interface to retrieve the media information and control the second user interface to provide the media information to a second display, the second network interface being configured to receive the media information from a second network,
   wherein the portable controller is configured to continue providing the media information to the first display subsequent to the transmitter outputting the second instructions and while the second user interface provides the media information to the second display,
   wherein the transmitter is configured to output to the receiver, as at least part of the second instructions, timing information in accordance with which the first user interface provides the media information to the first display, and
   wherein the processor is configured to control the second user interface to provide the media information to the second display in accordance with the received timing information.

2. A system according to claim 1, wherein the transmitter is configured to output the second instructions comprising at least a first part of the media information and wherein the processor is configured to instruct the second network interface to retrieve at least a second part of the media information from the second network and, initially control the second user interface to provide the first part of the media information to the second display and, subsequently control the second user interface to provide the second part of the media information to the second display via the second network.

3. A system according to claim 2, wherein the transmitter is configured to, when the first user interface receives a release instruction, forward release information to the receiver, the portable controller being configured to control the second user interface to provide the second part of the media information to the second display, when the receiver has received the release information.

4. A system according to claim 1, wherein the transmitter is configured to receive, from the first user interface, additional inputs, receive other media information from the first network and provide the other media information to the first display, while the second user interface continues to provide the media information to the second display.

5. A system according to claim 1, wherein the second instructions comprise a URL at which the media information may be accessed.

6. A system according to claim 1, wherein the media provider comprises a switch element and one or more signal inputs connected to the switch element, the second network interface and the second user interface being connected to the switch element and the processor being configured to control the switch element to switch signal or information from a controllable input or the second network interface to the second user interface, the portable controller being configured to, when the receiver receives the second instructions, instruct the switch element to switch signals or information from the second network interface to the second user interface.

7. A method of operating a system comprising a media provider and a controller, the controller comprising a first user interface, the media provider comprising a second user interface, the method comprising:
   A. receiving, by the first user interface, browsing information identifying media information available via a first network,
   B. receiving, by the controller, the media information from the first network, providing the media information on a first display associated with the first user interface and outputting the media information to the media provider, C. receiving, by the media provider, the media information from a second network and providing the media information on a second display associated with the second user interface, wherein operation B comprises receiving, by the controller, timing information in accordance with which the first user interface provides the media information to the first display, and wherein operation C comprises receiving, by the media provider, the timing information and controlling the second user interface provide the media information to the second display in accordance with the received timing information such that the first and second user interfaces provide the media information on the first and second displays simultaneously.

8. A method according to claim 7, wherein operation C. comprises:

I: initially providing, by the controller, at least a first part of the media information to the media provider and the second user interface providing the at first part of the media information to the second display, and II: subsequently, receiving, by the media provider, at least a second part of the media information from the second network and the second user interface providing the second part of the media information to the second display.

9. A method according to claim 8, wherein operation I comprises the first user interface receiving a release instruction and forwarding release information to the media provider, and wherein operation II is initiated by the media provider receiving the release information.

10. A method according to claim 7, wherein operation C comprises the first user interface receiving additional instructions identifying other media information, the controller receiving the other media information from the network and the first user interface providing the other media information on the first display, while the second user interface continues to provide the media information on the second display.

11. A method according to claim 7, wherein the corresponding information is a URL.

12. A method according to claim 7, wherein the media provider, during operation B., provides second media information received from an information input.

13. A system according to claim 1, wherein the receiver and transmitter are configured to communicate with each other via a wireless connection.

14. A system according to claim 1, wherein the receiver is configured to receive instructions from the controller and feed these to the media provider which is configured to act in accordance with the instructions to control connected information sources, sound providers and video providers thereof.

* * * * *